US010765052B2

(12) United States Patent
DeGarmo

(10) Patent No.: US 10,765,052 B2
(45) Date of Patent: Sep. 8, 2020

(54) DISC HARROW WITH GANG PLUGGING DETECTION

(71) Applicant: AGCO Corporation, Duluth, GA (US)

(72) Inventor: Rye DeGarmo, Beloit, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 16/317,262

(22) PCT Filed: Jul. 25, 2017

(86) PCT No.: PCT/IB2017/000868
§ 371 (c)(1),
(2) Date: Jan. 11, 2019

(87) PCT Pub. No.: WO2018/020310
PCT Pub. Date: Feb. 1, 2018

(65) Prior Publication Data
US 2019/0239413 A1 Aug. 8, 2019

Related U.S. Application Data

(60) Provisional application No. 62/366,227, filed on Jul. 25, 2016.

(51) Int. Cl.
*A01B 21/08* (2006.01)
*A01B 35/28* (2006.01)
*A01B 35/32* (2006.01)

(52) U.S. Cl.
CPC .............. *A01B 21/08* (2013.01); *A01B 35/28* (2013.01); *A01B 35/32* (2013.01)

(58) Field of Classification Search
CPC ........... A01B 5/00; A01B 21/08; A01B 35/16; A01B 35/28; A01B 35/32
(Continued)

(56) References Cited

U.S. PATENT DOCUMENTS 4,450,915 A 5/1984 Dehaii
6,158,523 A 12/2000 Gengler et al.
(Continued)

FOREIGN PATENT DOCUMENTS

EP 237 1190 A1 10/2011
GB 2398219 A 8/2004

OTHER PUBLICATIONS

UK Intellectual Property Office, Search Report for related UK Application No. GB1613845.5, dated Feb. 16, 2017.
(Continued)

*Primary Examiner* — Gary S Hartmann

(57) ABSTRACT

A disc harrow implement has gang assemblies each having aligned disc gangs carried by a support bar. Each disc gang has disc blades spaced along an axis of the disc gang. The disc gangs of each gang assembly are coaxially aligned to create a line of substantially equally spaced disc blades. A plugging detection system alerts an operator if one or more of the disc gangs are rotating at a rotational speed that is slower than rotational speeds of the remaining disc gangs. The plugging detection system includes a gang rotation sensor for each of disc gangs. Each gang rotation sensor is configured to measure the rotational speed of the connected disc gang. A control module compares the rotational speed of each disc gang to the rotational speed of the disc gangs and generates an output that indicates when a disc gang is rotating more slowly that the other disc gangs.

18 Claims, 6 Drawing Sheets

(58) Field of Classification Search
USPC .................. 172/6, 63, 68, 579, 599, 601
See application file for complete search history.

(56) References Cited

U.S. PATENT DOCUMENTS

| | | | |
|---|---|---|---|
| 9,485,900 B2* | 11/2016 | Connell | A01B 63/112 |
| 10,492,353 B2* | 12/2019 | Kovach | A01B 49/027 |
| 2013/0144827 A1 | 6/2013 | Schaffert | |
| 2019/0254223 A1* | 8/2019 | Eichhorn | G01B 21/18 |
| 2019/0373797 A1* | 12/2019 | Schoeny | A01C 7/203 |
| 2019/0373801 A1* | 12/2019 | Schoeny | A01B 76/00 |

OTHER PUBLICATIONS

European Patent Office, International Search Report related to International Application No. PCT/IB2017/000868, dated Oct. 19, 2017.

* cited by examiner

DISC HARROW WITH GANG PLUGGING DETECTION

CROSS-REFERENCE TO RELATED APPLICATIONS

This application is a national phase entry under 35 U.S.C. § 371 of International Patent Application PCT/162017/00868, filed Jul. 25, 2017, designating the United States of America and published in English as International Patent Publication WO 2018/020310 A1 on Feb. 1, 2018, which claimed the benefit of the filing date of U.S. Provisional Patent Application 62/366,227, filed Jul. 25, 2017; the entire disclosures of each of which are incorporated herein by reference.

FIELD

The present disclosure relates generally to an agricultural disc-harrow implement, and more particularly, to such a disc harrow implement that detects when a gang of disc blades becomes plugged with residue.

BACKGROUND

Modern farms are faced with a variety of problems, including increased concern for soil erosion, crop residue management and rising production costs with stagnant crop prices. One way farmers are successfully addressing each of these concerns is to reduce, as far as possible, the number of passes which a farmer must make over his fields. In corn growing operations, after the corn is harvested, it is important for the farmer to conduct fall tillage to bury the crop residue (e.g., stocks or stubble) from the harvested crop and to break up sub-soil compaction in preparation for spring planting. In order to accomplish both of these tasks in a single pass, disc harrow implements have been developed.

Disc harrows contain a set of rotating blades that cut and incorporate residue into the soil. The rotation of the blades is created by the forward travel of the implement being pulled through the field by a tractor. One typical disc harrow has a pair of wings, each having multiple gangs of disc blades, mounted on the front of the implement with the wings angled inward and rearward toward each other followed by another pair of wings having disc gangs which are angled inward and forward toward each other.

The process of moving soil and residue in various soil types and various soil conditions with a disc harrow can lead to plugging problems. This plugging typically occurs when residue gets stuck between the disc scraper and the disc blade, or when residue builds up around the disc gang connection points. Once this plugged condition occurs, the operator must take quick action to prevent building up a large pile of dirt and residue in front of the disc harrow. The pile of residue is undesirable as it impacts planting conditions and has the potential to reduce the lift of the disc harrow.

BRIEF SUMMARY

An agricultural disc harrow implement has a main frame and at least one gang assembly. Each gang assembly has a support bar extending substantially the length of the gang assembly, the support bar being attached to the main frame. The gang assembly has a plurality of disc gangs aligned along the length of the support bar, wherein each disc gang has a rotating disc gang shaft that is supported on the support bar and a plurality of disc blades, the disc blades being substantially equally spaced along an axis of the disc gang. The disc gangs of each gang assembly are coaxially aligned to create a line of substantially equally spaced disc blades. The implement also includes a plugging detection system configured to alert an operator if one or more of the disc gangs are rotating at a rotational speed that is slower than rotational speeds of the remaining disc gangs. The plugging detection system includes a gang rotation sensor for each of the disc gangs on each of the gang assemblies. Each gang rotation sensor is configured to measure the rotational speed of the connected disc gang. A control module compares the rotational speed of each disc gang to the rotational speed of the other disc gangs and generates an output that indicates when a disc gang is rotating more slowly than the other disc gangs.

In one aspect, spacer spools are used between adjacent disc blades to maintain a desired spacing of the disc blades along the disc gang. The gang rotation sensor for each of the plurality of disc gangs is received into one of the spools along the disc gang.

Another aspect of the invention is a method for operating a disc harrow implement, wherein the disc harrow implement has at least one gang assembly comprising a plurality of disc gangs, and wherein each disc gang mounts a plurality of disc blades. The method includes measuring the rotational speed of each of the disc gangs with gang rotation sensors. The method includes transmitting the rotational speed of each of the disc gangs and comparing the rotational speeds with a control module. The method also includes displaying an alert if one of the disc gangs is rotating at a speed that is a set amount slower than other of the disc gangs.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The above mentioned and other features will become more apparent and will be better understood by reference to the following description of embodiments taken in conjunction with the accompanying drawings, wherein.

Corresponding reference characters indicate corresponding parts throughout the views of the drawings.

DETAILED DESCRIPTION

Figure 1:
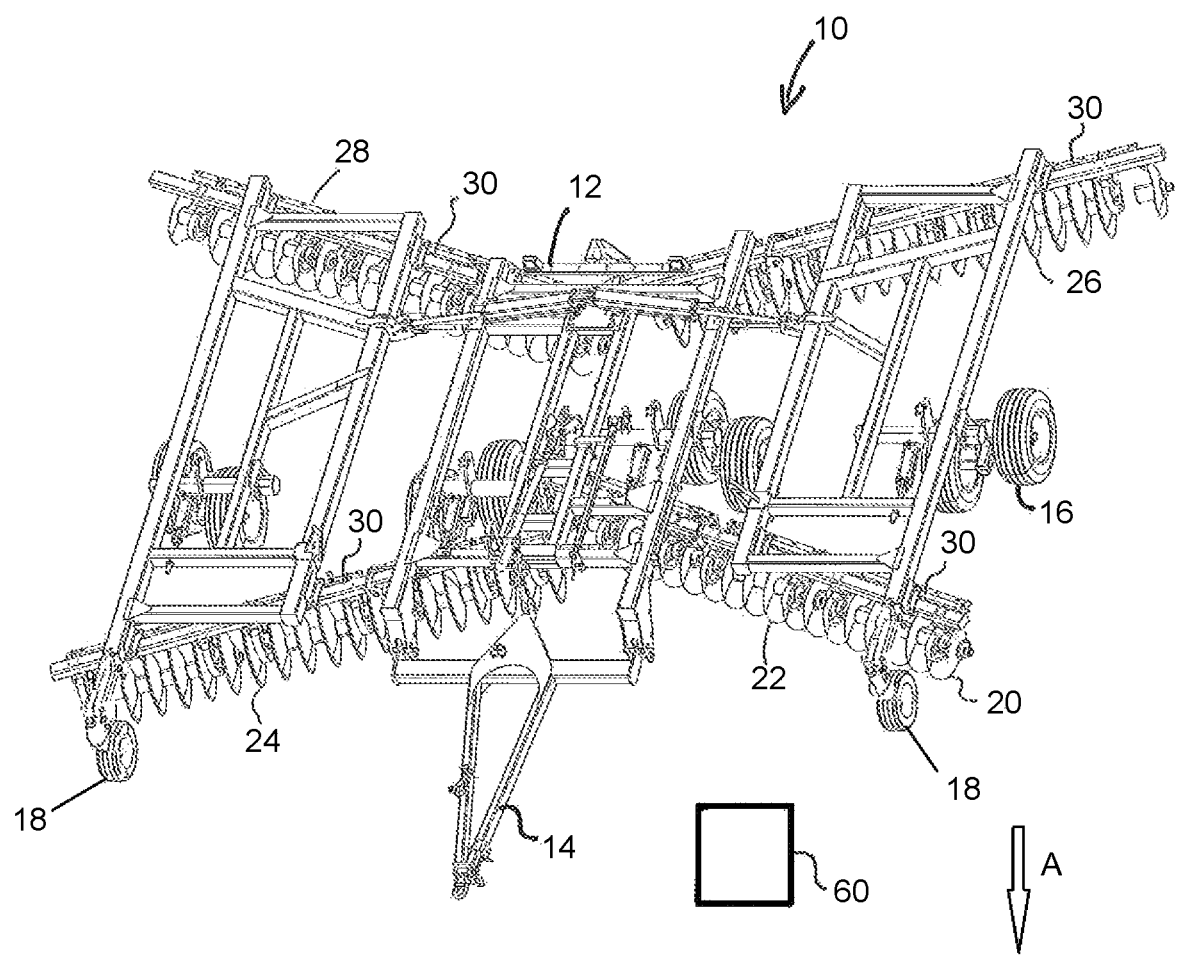
FIG. 1 is a perspective view of an agricultural disc harrow implement with a pair of front and rear disc gangs, each of which mount a plurality of discs.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates an agricultural disc harrow implement, generally indicated at 10. An agricultural vehicle such as a tractor pulls the implement 10 in a direction of motion A. The implement 10 includes a main frame 12 having a hitch 14 on the front end that may be used to connect the implement 10 to the agricultural vehicle. A set of center wheels 16 is attached across the main frame 12 at positions, for example, roughly midway between the front and rear ends of the main frame 12, and which support the implement 10 and provide depth adjustment, in a known manner. Additionally, a set of pivoting wheels 18 is connected to front distal ends of the main frame 12 in a known manner.

The implement 10 also includes a plurality of disc blades 20 mounted on one or more gang assemblies 21 attached to the main frame 12. In accordance with one example configuration illustrated in FIG. 1, the gang assemblies 21 are arranged with a front left wing 22, a front right wing 24, a rear left wing 26, and a rear right wing 28. However one skilled in the art will understand that the one or more gang assemblies 21 on the implement 10 may be arranged in other suitable configurations as would be known in the art. In the illustrated embodiment, the front left and right wings 22 and 24 are preferably positioned at respective converging angles which extend inward and rearward from outside to inside, while the rear left and right wings 26 and 28 are preferably positioned at respective converging angles which extend inward and forward from outside to inside. The front left wing 22 and the front right wing 24 are aligned with the rear left wing 26 and the rear right wing 28, respectively, such that the ground is engaged by the plurality of disc blades 20 as the implement 10 is pulled in the direction of motion A by the agricultural vehicle. Each wing 22, 24, 26, 28 includes a transverse, angled support bar 30 extending substantially the length of the wing. The support bar 30 is attached to the main frame 12.

Figure 2:
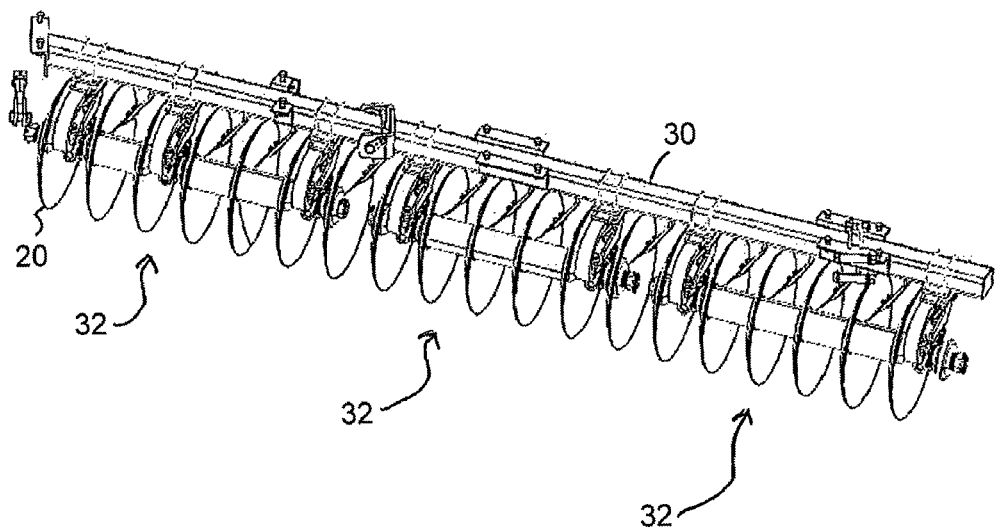
FIG. 2 is a perspective view of one gang assembly of the implement of FIG. 1 showing three gangs, each of which mount a plurality of discs.

Turning also now to FIG. 2, each wing 22, 24, 26, 28 includes a plurality of disc gangs 32 aligned along the length of the support bar 30 of the wing. Each disc gang 32 is comprised of a plurality of the disc blades 20 substantially equally spaced along an axis of the disc gang 32. In the illustrated embodiment, each wing 20 has three disc gangs 32, and each disc gang 32 mounts either 6 or 7 disc blades 20. However, one skilled in the art will understand that fewer or more disc blades 20 may be mounted on each disc gang 32 and fewer or more disc gangs 32 may comprise each wing 22, 24, 26, 28. The disc gangs 32 of a wing 22, 24, 26, 28 are coaxially aligned to create a line of substantially equally spaced disc blades 20

Figure 3:
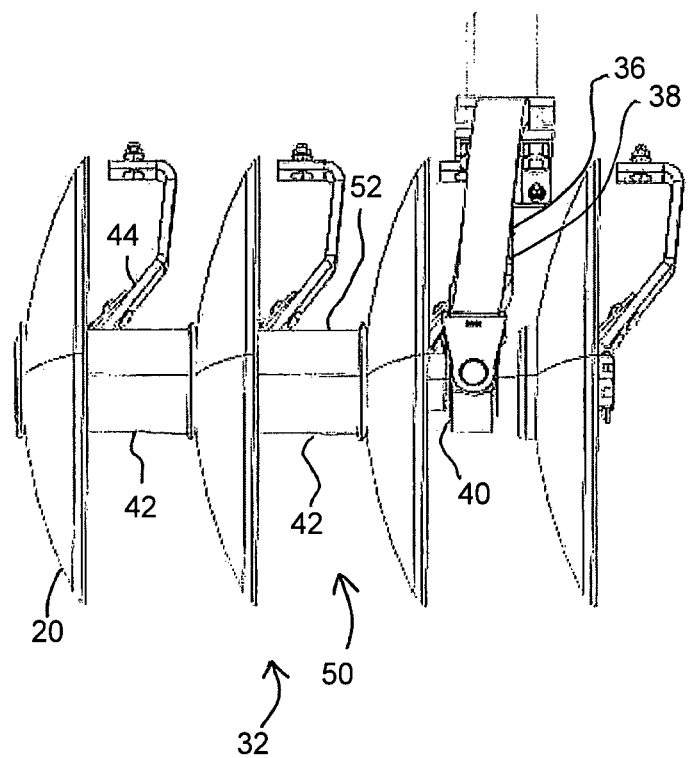
FIG. 3 is a front elevation of a portion of one gang of the implement of FIG. 1.
Figure 4:
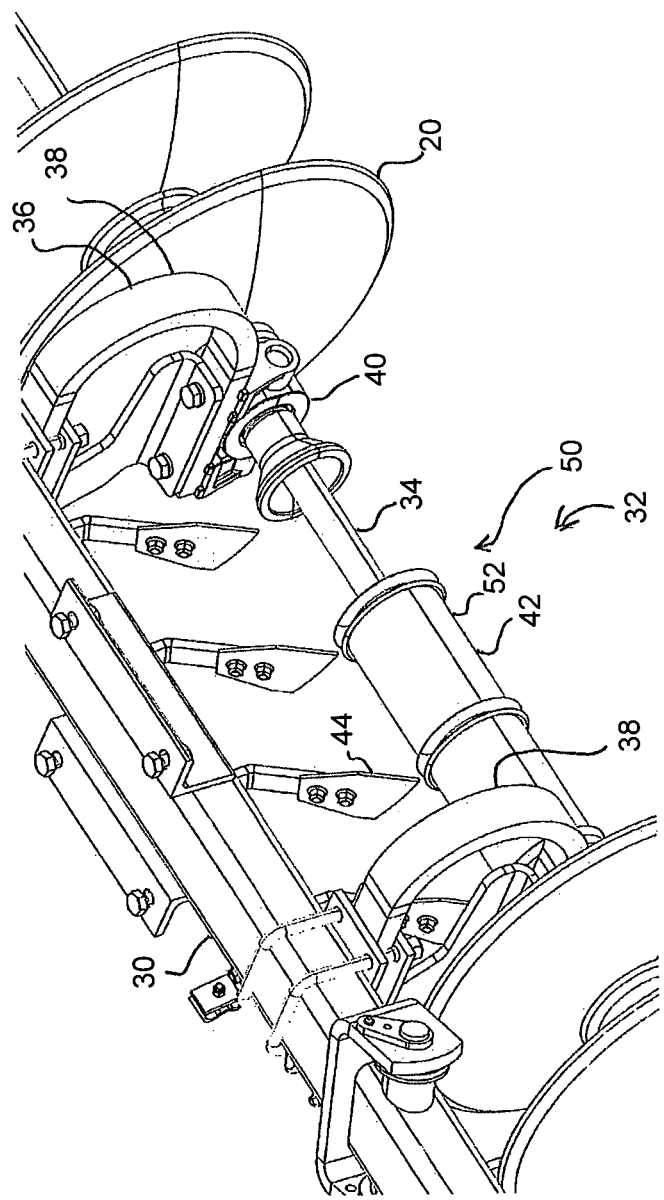
FIG. 4 is a greatly enlarged perspective view of a portion of one gang with parts removed to show features of the implement.

As better seen in FIGS. 3 and 4, each disc gang 32 includes a rotating disc gang shaft 34 which is supported on the support bar 30 using a shaft mounting mechanism 36. It is desirable that the disc blades 20 be resiliently mounted to their respective support bars 30 to prevent the disc blades 20 from being damaged or broken when striking an obstacle, such as a large rock in the field. The disc mounting mechanism 36 for the ganged disc blades 20 allows the disc blades 20 freedom to move vertically, laterally, and/or torsionally away from obstacles and hard spots to avoid damage to the disc blades 20. One suitable disc mounting mechanism is shown in U.S. Pat. RE38,974, "Agricultural Disc Mounting System and Method," reissued Feb. 14, 2006, which uses C-shaped springs 38 to mount the disc gang shaft 34 on the support bar 30. A suitable bearing 40 is mounted to a lower leg of the spring 38 to allow rotation of the gang shaft 34. However, one skilled in the art will understand that other means for mounting the disc gang shaft 32 to the support bar 30 may be contemplated using sound engineering judgment.

Spools 42 are used in between adjacent disc blades 20 to maintain the desired spacing of the disc blades 20 along the wing. Disc scrapers 44 may be attached to the support bar 30 to have an edge adjacent each disc blade 20 to keep dirt and residue from sticking to the disc blade.

In some embodiments, the implement 10 further includes a plugging detection system 50 configured to alert an operator if one or more of the disc gangs 32 on the implement are becoming plugged, thereby preventing the disc gang 32 from rotating as normal. Each disc gang 32 has a gang rotation sensor 52 configured to measure the rotational speed of the disc gang. The plugging detection system 50 also includes a control module 60 (FIG. 1) that compares the rotational speed of each disc gang 32 to the rotational speed of the disc gangs 32. If one disc gang 32 starts to become plugged, the plugged disc gang 32 will rotate slower than the other disc gangs 32. When a complete plugged condition occurs, the plugged disc gang 32 stops rotating completely while the other disc gangs 32 continue turning.

In one embodiment, the gang rotation sensor 52 is attached to or built into one of the spools 42 along the disc gang 32. In one embodiment, the gang rotation sensor 52 is a wireless sensor built into the spool 42. In one example, the spool 42 is about 8.5 inches long, has an outer diameter of about 5.5 inches and an inner diameter of about 1.75 inches and the gang rotation sensor 52 is configured to fit within the dimensions of the spool 42. In one embodiment, the spool 42 is made of welded steel, however other materials such as carbon fiber, or glass-filled nylon material could be used in place of steel. The wireless gang rotation sensor 52 transmits the rotational speed of the disc gang 32 to the control module 60, which can then display a plugging alert to the operator on the console or tablet in a cab of the agricultural vehicle. Alternately, connecting wires can run up the spring 38 to support bar 30 and to the control module 60. In an alternate embodiment, the gang rotation sensor 52 is integrated with the bearing 40.

The gang rotation sensor 52 may be self-powered such that rotation of the disc gang 32 causes the gang rotation sensor 52 to generate electrical power to operate the sensor and send the rotational speed information to the control module 60. Having a wireless gang rotation sensor 52 may prevent wires from being exposed and possibly damaged during operation of the implement 10. The gang rotation sensor 52 may be configured to transmit only during active rotation of the disc gang 32 and goes into hibernation when not in use.

Figure 5:
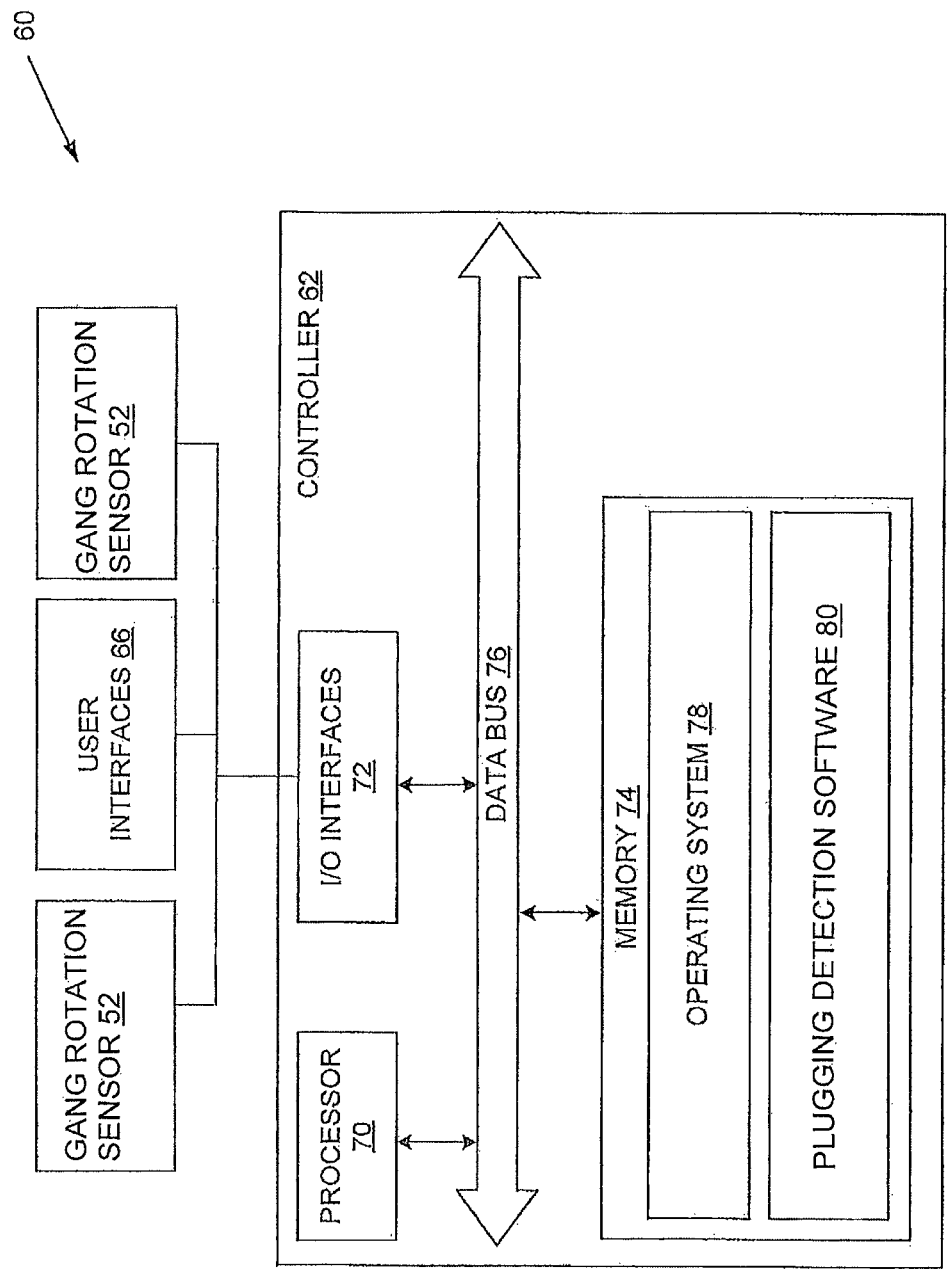
FIG. 5 is a block diagram that illustrates an embodiment of an example control module for the implement.

Having described the overall structure and functionality of the plugging detection system 50, attention is now directed to FIG. 5 (with continued reference to FIGS. 1-4), which shows an embodiment of an example control module 60 that may be used to control operations of the plugging detection system 50. In one embodiment, the control module 60 comprises a controller 62 (e.g., an electronic control unit or ECU) coupled to the plurality of gang rotation sensors 52 for each of the disc gangs 32 and a user interface 66. One having ordinary skill in the art should appreciate in the context of the present disclosure that the example controller 62 is merely illustrative, and that some embodiments of controllers may comprise fewer or additional components, and/or some of the functionality associated with the various components depicted in FIG. 5 may be combined, or further distributed among additional modules or controllers. Further, it should be appreciated that, though described in the context of residing in a single controller 62, functionality of the controller 62 may be distributed among a plurality of controllers in some embodiments, and in some embodiments, one or more of the functionality of the controller 62 may be achieved remote from the implement 10 (e.g., FIG. 1, where the implement 10 has telecommunications and/or internet connectivity functionality). The controller 62 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 62. In one embodiment, the controller 62 comprises one or more processors, such as processor 70, input/output (I/O) interface(s) 72, and memory 74, all coupled to one or more data buses, such as data bus 76. The memory 74 may include any one or a combination of volatile memory elements (e.g., random-access memory RAM, such as DRAM, and SRAM, etc.) and nonvolatile memory elements (e.g., ROM, hard drive, tape, CDROM, etc.). The memory 74 may store a native operating system, one or more native applications, emulation systems, or emulated applications for any of a variety of operating systems and/or emulated hardware platforms, emulated operating systems, etc.

In the embodiment depicted in FIG. 5, the memory 74 comprises an operating system 78 and plugging detection software 80. It should be appreciated that in some embodiments, additional or fewer software modules (e.g., combined functionality) may be deployed in the memory 74 or additional memory (or in different devices). In some embodiments, a separate storage device may be coupled to the data bus 76, such as a persistent memory (e.g., optical, magnetic, and/or semiconductor memory and associated drives). The storage device may be a removable device, such as a memory stick or disc.

In one embodiment, plugging detection software 80 is executed by the processor 70 to receive user input at the user interfaces 66 (e.g., one or a combination of console button, switch, knob, hydro handle or joystick, scroll wheel, display screen with selectable icon displayed on the screen that is manipulated by a mouse or joystick, display screen embodied with selectable icons on a touch-type screen, microphone on a headset or on the console, etc.), and match or associate (e.g., via look-up table or in some embodiments via programmed switch position activation) the input from the gang rotation sensors.

The user interface 66 may comprise a display screen coupled to the controller 62 with selectable icons, a hydro handle or joystick with selectable buttons or switches, a console with switches, button, knobs, scroll wheel, a microphone, etc., with corresponding signals from operator input received at the user interfaces 66 delivered via the I/O interfaces 72 to the plugging detection software 80 executing on the processor 70. The output from the plugging detection software 80 is provided to the user interface 66, which in turn displays a warning of the plugged condition.

Execution of the plugging detection software 80 may be implemented by the processor 70 under the management and/or control of the operating system 78. For instance, as is known, the source statements that embody the method steps or algorithms of the plugging detection software 80 may be translated by one or more compilers of the operating system 78 to assembly language and then further translated to a corresponding machine code that the processor 70 executes to achieve the functionality of the plugging detection software 80. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processor 70. Also, register transfer language (or other hardware description language) may be used to translate source code to assembly language, which the one or more operating system compilers translate to executable machine code. In some embodiments, the operating system 78 may be omitted and a more rudimentary manner of control implemented. The processor 70 may be embodied as a custom-made or commercially available processor, a central processing unit (CPU) or an auxiliary processor among several processors, a semiconductor based microprocessor (in the form of a microchip), one or more application specific integrated circuits (ASICs), a plurality of suitably configured digital logic gates, and/or other well-known electrical configurations comprising discrete elements both individually and in various combinations to coordinate the overall operation of the controller 62.

The I/O interfaces 72 provide one or more interfaces to one or more devices, such as, the user interfaces 66 and the gang rotation sensors 52, among other devices that are coupled directly or indirectly (e.g., over a bus network, such as a CAN network, including one operating according to ISO-bus) to the controller 62. The I/O interfaces 72 may also comprise functionality to connect to other networks. For instance, the I/O interfaces 72 may include a network interface that enables remote or wireless communications, such as via well-known telemetry functionality, Bluetooth communications, near-field, among other electromagnetic spectrum communications.

Figure 6:
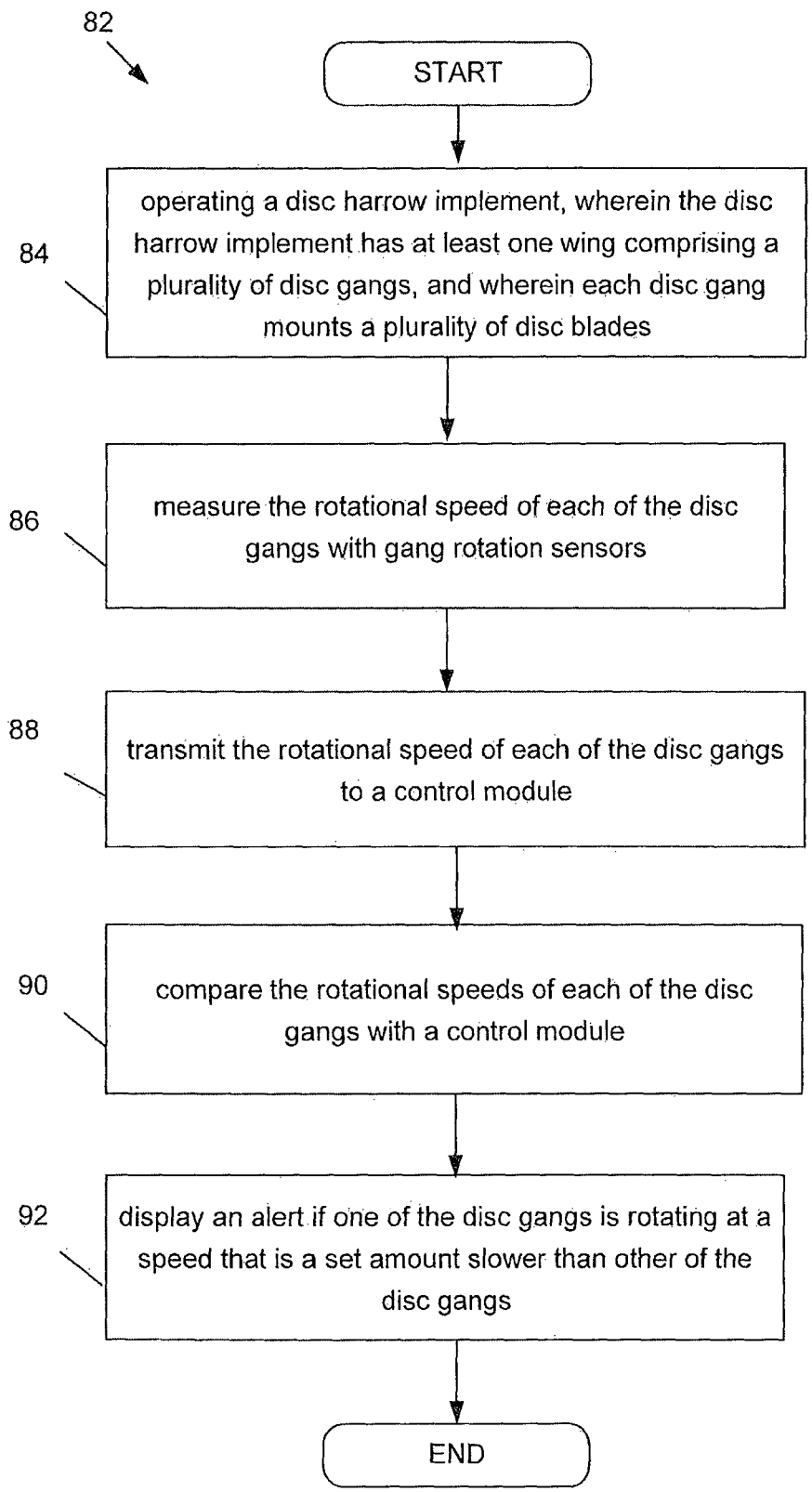
FIG. 6 is a flow diagram that illustrates an embodiment of an example method of operating an implement to determine if a disc gang of the implement is becoming plugged.

Having described some example embodiments of the disc harrow implement 10, it should be appreciated in view of the present disclosure that one embodiment of a method of operating a disc harrow implement 10, the method depicted in FIG. 6 and denoted as method 82, comprises at step 84 operating a disc harrow implement 10 in a field, the disc harrow implement 10 having at least one wing 22, 24, 26, 28 comprising a plurality of disc gangs 32, each disc gang 32 mounting a number of disc blades 20. At step 86, the method measures the rotational speed of each of the disc gangs with gang rotation sensors 52. At step 88, the method transmits the rotational speed of each of the disc gangs 32 to a control module 60. At step 90, the method compares the rotational speeds of each of the disc gangs 32 with a control module 60. At step 92, the method displays an alert if one of the disc gangs 32 is rotating at a speed that is a set amount slower than other of the disc gangs 32.

Any process descriptions or blocks in flow charts should be understood as representing steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. An agricultural disc harrow implement comprising:
a main frame;
at least one gang assembly, each gang assembly comprising:
a support bar attached to the main frame and extending substantially the length of the gang assembly;
a plurality of disc gangs aligned along the length of the support bar, wherein each of the plurality of disc gangs comprises a rotating disc gang shaft that is supported on the support bar and a plurality of disc blades, the disc blades being substantially equally spaced along an axis of the disc gang, wherein the disc gangs of each gang assembly are coaxially aligned to create a line of substantially equally spaced disc blades; and
a plugging detection system configured to alert an operator if one or more of the disc gangs are rotating at a rotational speed that is slower than rotational speeds of the remaining disc gangs, the plugging detection system comprising a gang rotation sensor for each of the plurality of disc gangs on each of the at least one gang assemblies configured to measure the rotational speed of the connected disc gang and a control module that compares the rotational speed of each disc gang to the rotational speed of the remaining disc gangs.

2. The agricultural disc harrow implement of claim 1, further comprising a plurality of spacer spools between adjacent disc blades configured to maintain a desired spacing of the disc blades along the disc gang, wherein the gang rotation sensor for each of the plurality of disc gangs is received into one of the spools along the disc gang.

3. The agricultural disc harrow implement of claim 2, wherein the gang rotation sensor is a wireless sensor mounted in the spool.

4. The agricultural disc harrow implement of claim 3, wherein the wireless gang rotation sensor transmits the rotational speed of the disc gang to the control module.

5. The agricultural disc harrow implement of claim 1, wherein each of the at least one gang assemblies has three disc gangs.

6. The agricultural disc harrow implement of claim 1, wherein each disc gang is mounted to the support bar with a spring and a bearing, and wherein the gang rotation sensor for each of the plurality of disc gangs is integrated with the bearing.

7. The agricultural disc harrow implement of claim 6, wherein the gang rotation sensor is connected to the control module via a wire that runs along the spring.

8. A method for operating a disc harrow implement, wherein the disc harrow implement has at least one gang assembly comprising a plurality of disc gangs, and wherein each disc gang mounts a plurality of disc blades, the method comprising:
measuring the rotational speed of each of the disc gangs with gang rotation sensors;
transmitting the rotational speed of each of the disc gangs to a control module;
comparing the rotational speeds of each of the disc gangs using the control module; and
displaying an alert if one of the disc gangs is rotating at a speed that is a determined amount slower than other of the disc gangs.

9. The method of claim 8, wherein measuring the rotational speed of each of the disc gangs comprises measuring the rotational speed of each of the disc gangs with gang rotation sensors disposed in one of a plurality of spacer spools configured to maintain spacing of the disc blades along the disc gang.

10. The method of claim 9, wherein transmitting the rotational speed of each of the disc gangs to a control module comprises transmitting the rotational speed wirelessly from the gang rotation sensors to the control module.

11. An agricultural disc harrow implement comprising:
a plurality of disc gangs carried by a support bar, wherein each disc gang of the plurality comprises a rotating disc gang shaft supported by the support bar and having a plurality of disc blades, wherein the disc blades are substantially equally spaced along an axis of the disc gang shaft, wherein the disc gangs are coaxially aligned to create a line of substantially equally spaced disc blades; and
a plugging detection system comprising:
a plurality of gang rotation sensors, each gang rotation sensor configured to detect a rotational speed of one of the plurality of disc gangs; and
a control module configured to compare the rotational speeds of each disc gang of the plurality to the rotational speeds of other disc gangs of the plurality.

12. The agricultural disc harrow implement of claim 11, further comprising a plurality of spacer spools between adjacent disc blades and configured to maintain the substantially equal spacing of the disc blades along the disc gang, wherein the gang rotation sensor for each of the plurality of disc gangs is disposed in one of the spools along the disc gang.

13. The agricultural disc harrow implement of claim 12, wherein each gang rotation sensor comprises a wireless sensor mounted in the spool.

14. The agricultural disc harrow implement of claim 13, wherein each wireless sensor is configured to transmit the rotational speed of a respective disc gang to the control module.

15. The agricultural disc harrow implement of claim 11, wherein the plurality of disc gangs comprises three disc gangs extending substantially a length of the support bar.

16. The agricultural disc harrow implement of claim 11, wherein each disc gang of the plurality is mounted to the support bar with a spring and a bearing.

17. The agricultural disc harrow implement of claim 16, wherein each gang rotation sensor is integrated with a respective bearing.

18. The agricultural disc harrow implement of claim 16, wherein each gang rotation sensor is connected to the control module via a wire that runs along a respective spring.

* * * * *